United States Patent [19]
Sybertz

[11] 3,882,912
[45] May 13, 1975

[54] CUTTER FOR WOOD CHIPPER HAVING RADIALLY OFFSET BLADES

[75] Inventor: Hans Sybertz, Hargesheim, Germany

[73] Assignee: Hombak Maschinenfabrik KG, Bad Kreuznach, Germany

[22] Filed: Aug. 24, 1973

[21] Appl. No.: 391,159

[30] Foreign Application Priority Data
Aug. 25, 1972 Germany.............................. 2241938

[52] U.S. Cl. .................... 144/172; 29/105; 144/42; 144/218; 144/230; 241/292.1
[51] Int. Cl. ............................................... B27c 1/00
[58] Field of Search........ 144/218, 172, 162 R, 174, 144/176, 230, 42, 41, 43; 241/292.1, 293, 294, 295; 29/105

[56] References Cited
UNITED STATES PATENTS

| 15,161 | 3/1906 | Hall ................................ 144/218 X |
| 1,062,634 | 5/1931 | Buckhart ........................... 144/218 |
| 2,449,605 | 9/1948 | Kelton .............................. 144/230 |
| 2,813,557 | 11/1957 | Thompson ......................... 144/172 |
| 2,899,992 | 8/1959 | Key................................... 144/172 X |
| 3,017,912 | 1/1962 | Sybertz et al..................... 144/212 X |
| 3,195,594 | 7/1965 | Bloomquist et al............. 144/172 X |

Primary Examiner—Andrew R. Juhasz
Assistant Examiner—W. D. Bray
Attorney, Agent, or Firm—Karl F. Ross; Herbert Dubno

[57] ABSTRACT

A cutter for a wood-chipping apparatus has a drum provided around its periphery with a plurality of blades. Straight-edged blades defining with the cutting edges on rotation of the arbor an inner orbit alternate with comb blades each having a plurality of in-line outer blade regions defining an orbit outside the inner orbit. Inclined intermediate flanks extend from the regions of the outer regions of the cutting edge of the comb blades at an angle of 45° to the outer orbit and cross the inner orbit. The arbor is formed ahead of the comb blades with a diameter that is greater than its diameter elsewhere by a distance equal to the radial spacing between the inner and outer orbits.

3 Claims, 4 Drawing Figures

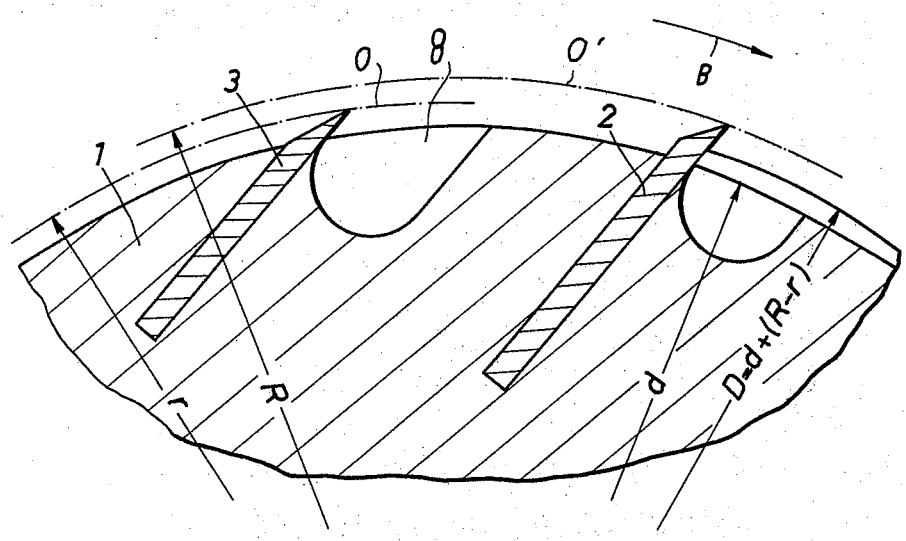
Fig. 1
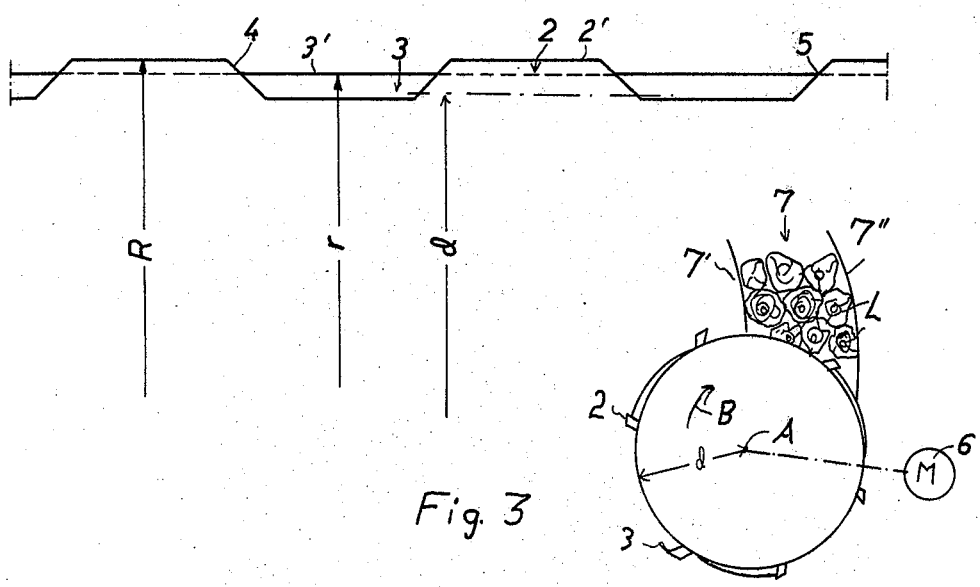
Fig. 2
Fig. 3

CUTTER FOR WOOD CHIPPER HAVING RADIALLY OFFSET BLADES

CROSS-REFERENCE TO RELATED APPLICATIONS

This application is related to my copending application Ser. No. 322,108 filed Feb. 13, 1973 for a METHOD OF AND APPARATUS FOR PRODUCING WOOD CHIPS and to my copending application Ser. No. 333,691 filed on Feb. 20, 1973 for a CUTTER FOR WOOD COMMINUTING MACHINE.

FIELD OF THE INVENTION

The present invention relates to wood chipping. More particularly this invention relates to a cutter drum for a wood-chipping apparatus.

BACKGROUND OF THE INVENTION

For the production of strong chipboard it is desirable to use chips having an average thickness between 0.8 and 1.0 mm, which is substantially greater than the average 0.5 mm thickness produced by conventional chippers. As the thickness of the chips increases, so does the bluntness of their ends. As a matter of fact cutting such thick chips from larger pieces of wood often results in about 20% waste in the form of very fine unusable particles that splinter off the ends of the chips. These blunt chip ends are detrimental in that they do not let the many chips in a board lie neatly together, so that the finished product is unattractive.

It has been suggested to use a so-called comb blade which has a stepped cutting edge with alternating upstanding edges and recessed edges. The upstanding and recessed edges of the comb blade are joined by sharp flanks which are inclined to these two edges and serve to give the chips pointed ends. Such an arrangement produces a considerable quantity of useless fine particles because of the overlap of the blades as they follow one another. When a straight-edged blade is alternated with the comb blade such overlap is reduced, but the fine-particle portion is increased. The extent of overlap in the region of the inclined cutting edges is dependent on the condition of the comb and on the range of chip thickness. If the flanks between the stepped cutting portions of the comb blade run perpendicular to the rotation axis of the blade the overlap remains the same, but the proportion of fine particles is again increased.

There is disclosed in the former of my above-described patent applications an invention which is based on the discovery that the reason drum-type wood chippers do not produce chips of like thickness is because the pieces of wood fed to the cutter in the conventional systems advance with the same linear speed into the orbit of the cutter over a segment thereof so that those pieces coming into contact with the blades more radially than tangentially will have relatively thick chips sliced off them, and those arriving more tangentially than radially will have relatively thin slices cut off them. This phenomenon is the result of the changing velocity component of the blade in the radial direction as the blade sweeps through the aforementioned segment of the orbit arc subtended by the feed chute.

This prior system overcomes this disadvantage by providing means in the feed chute which advances those workpieces arriving more tangentially than radially at a faster rate than the other workpieces. The result is a surprising uniformity in thickness in the chips. The invention thus provides for advancing the column of wood toward the orbit of the blades at rates proportional to the radial velocity component thereof across the aforementioned segment of the orbit arc.

Also according to my earlier system the apparatus has a feed shaft having one side which forms a flatter angle with the orbit of the cutter than the other side, and means (e.g., an endless conveyor) on this side serves to advance the pieces of wood engaging it faster than those engaging the opposite side of the shaft. This other side of the shaft is generally radial to the cutter orbit.

In accordance with yet another feature of my earlier system the shaft is substantially rectangular in section and curved with one end opening downwardly into the orbit of the cutter and the other end extending substantially horizontally off to the side. Such an arrangement substantially reduces the height of the chipping apparatus. Furthermore, both sides have the same center of curvature so that toothed chains acting as the feed means on these sides can be carried on respective sprockets on a common shaft, and the chains will move at different speeds for uniform chip production. The logs are generally parallel to the cutter axis as they are delivered to the cutter so that the chips have their fibers parallel to the line of the cut.

The latter of the above-cited applications describes a wood chipping apparatus having a cutter which is provided with clamping wedges located behind the blade, relative to the direction of rotation. The blade may be mounted on an element (movable intermediate body) which is mounted on the drum so that it cannot move radially outwardly, and the wedge engages between this element and the rear or trailing flank of the slot to wedge the blade tightly in place. Such an arrangement is particularly adapted for a wood chipper, although the cutter of a shaper, router, planer or the like could also be so constructed.

An arrangement made in this manner overcomes the problem of machining down the wedge since the surface in back of the blade is far less critical than the surface in front of it. In addition it has been found that the worst wear on the arbor is in that region directly behind the blade. The blade mounting element and the centrifugal wedge are both removable and replaceable so that this region of wear can be renewed easily. In other words, the blade is held against the leading flank of the drum (this term connoting also a blade-carrying shaft or arbor by a wedge, an intermediate body, which may be the blade carrier, being movable in the slot and received between the wedge and the blade.

According to another feature of this arrangement the blade carrier can have a foot engaging radially inside a lip or similar backwardly directed formation on the leading side of the slot so as to prevent the blade from working out. The blade carrier can be pivotally mounted on the arbor so as to pivot back from the leading edge of the blade-receiving slot.

In accordance with yet another feature of my prior invention the wedge is biased in the radial direction of convergence of the tapering flanks. With an inwardly tapering wedge a tension spring is connected between its inner end and the base of the slot; with an outwardly tapering wedge a compression spring is provided between its inner end and the base of the slot. In both cases simple displacement of the wedge in the direction opposite its taper serves to free the blade and blade carrier for replacement or other servicing.

OBJECTS OF THE INVENTION

It is an object of the present invention to provide an improved wood-chipping system.

Another object is to advance the principles laid out in my above-described applications.

A further object is the provision of a cutter for a wood chipper which produces large chips having pointed ends and which produces a very small proportion of unusable fines.

SUMMARY OF THE INVENTION

These objects are attained according to the present invention in a wood chipper having a cutter comprising an arbor or drum rotatable about its longitudinal axis and provided on its periphery with at least two blades. One blade has a straight cutting edge and defines a cylindrical orbit spaced outwardly from the surface of the arbor. The other blade is a comb blade and has a stepped cutting edge with outer portions defining a cylindrical orbit spaced outwardly from the orbit of the straight blade.

According to another feature of this invention the outer regions of the comb blade terminate in flanks intersecting the orbit of the straight-edge blade and lying at an angle of substantially 45° to this orbit.

Such an arrangement gives well-defined cutting relationships for the comb blade. An undesirable recutting by the straight blade of the chips cut off by the comb blade is avoided, thereby substantially reducing the portion of useless fine particles. Due to the radial spacing of the various orbits, the edges and corners of the comb blade do not wear as rapidly as in prior-art devices, as the wood being cut does not scrape on these edges.

In accordance with yet another feature of this invention the arbor is formed only in front of the blade defining the larger orbit with a diameter which is greater than its diameter elsewhere by a distance equal to the differences between the radius of the orbit of the outer blade edges and the radius of the orbit of the straight-edge blade.

DESCRIPTION OF THE DRAWING

The above and other objects, features, and advantages of the invention will become more readily apparent from the following description, reference being made to the accompanying drawing in which:

FIG. 1 is an end sectional view of a cutter according to the present invention;

FIG. 2 is a diagram illustrating the intersections of the various orbits with a plane through the rotation axis of the cutter;

FIG. 3 is an end view through a wood chipper with the cutter FIG. 1.

SPECIFIC DESCRIPTION

Figure 4:
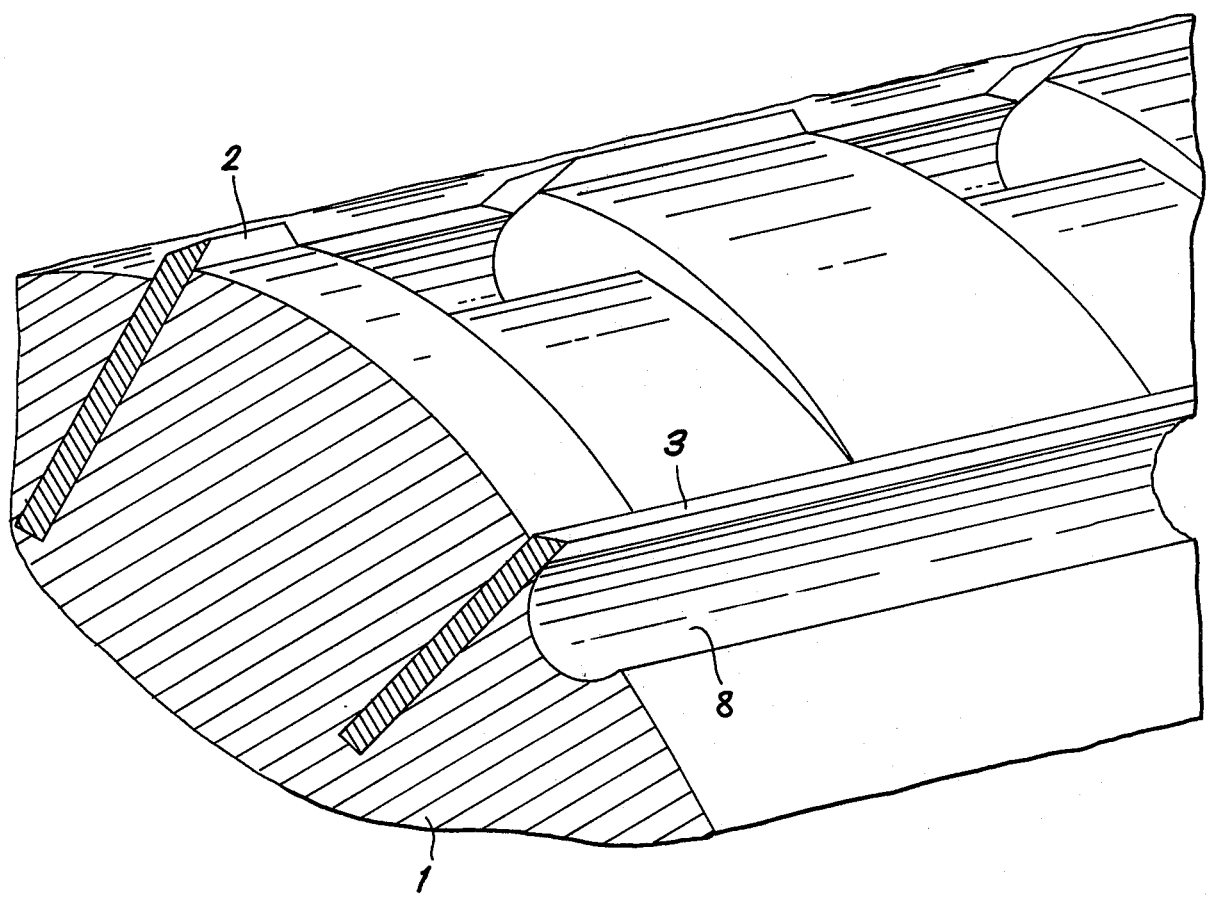
FIG. 4 is a fragmentary perspective view of the cutter.

As shown in FIG. 3 a chipping machine has a cutter body 1 rotatable about an axis A by a motor in a direction indicated by arrow B. Logs L are fed to the periphery of the arbor 1 in a chute 7 having a chain on its radial side 7' which advances the logs L more slowly than on its offradial or tangential side 7" as described in the above-cited patent application Ser. No. 322,108 entitled METHOD OF AND APPARATUS FOR PRODUCING WOOD CHIPS.

As shown in FIGS. 1, the arbor 1 and 4 is fitted with blades 2 and 3, alternating with each other and held in place as described in the above-cited patent application entitled CUTTER FOR WOOD COMMINUTING MACHINE. The blade 3 has a cutting edge 3' which defines on rotation of the arbor 1 a cylindrical orbit 0. The blade 2 is a so-called comb blade and has outer blade edges 2' all extending in line parallel to the axis A and defining an outer orbit 0' on rotation of the arbor 1, with flanks 4 inclined at 45° to the orbits 0 and 0' extending down from the outer blade edges 2', giving the edge a trapezoidal outline. The flanks 4 each intersect the orbit 0 at a point 5, and the arbor 1 is formed in front of the blades 2 and 3 with pockets 8.

The outer orbit 0" has a radius $R$, as shown in FIG. 2, and the inner orbit 0 has a smaller radius $r$. The arbor has a diameter $d$ which is increased in regions in front, relative to direction B, of the blades 2 to a diameter $D$ equal to $d \pm R - r$. This ensures that the chips are of uniform thick cross section, with a minimal portion of uselessly fine particles.

What is claimed is:

1. A cutter for a wood-chipping apparatus, said cutter comprising an arbor rotatable about an axis, at least one first blade secured to said arbor and having an edge projecting from said arbor and defining on rotation thereof an inner orbit, and at least one second blade secured to said arbor and having a plurality of axially spaced and aligned outer edges projecting from said arbor and defining on rotation thereof an outer orbit radially outside said inner orbit, said arbor having relative to the rotation direction thereof a diameter in front of said second blade equal to the diameter in back of the second blade plus the radial distance between said inner and outer orbits.

2. The cutter defined in claim 1 wherein said second blade is formed at each end of its edges with an inclined flank extending at an angle to said outer orbit and crossing said inner orbit.

3. The cutter defined in claim 2 wherein all of said edges are straight and extend parallel to generatrices of said arbor.

* * * * *